United States Patent
Chen et al.

(10) Patent No.: US 10,135,752 B2
(45) Date of Patent: Nov. 20, 2018

(54) EXPANSION DEVICE FOR VIRTUAL INTERFACE AND NETWORK SERVER SYSTEM THEREOF

(71) Applicant: ALIANE TECHNOLOGIES CO., Taipei (TW)

(72) Inventors: Huai-En Chen, Taipei (TW); Chia-Chen Hu, Taipei (TW)

(73) Assignee: ALIANE TECHNOLOGIES CO. (TW)

( * ) Notice: Subject to any disclaimer, the term of this patent is extended or adjusted under 35 U.S.C. 154(b) by 209 days.

(21) Appl. No.: 15/152,197

(22) Filed: May 11, 2016

(65) Prior Publication Data

US 2016/0373374 A1 Dec. 22, 2016

(30) Foreign Application Priority Data

Jun. 17, 2015 (TW) .............................. 104119544 A (51) Int. Cl.
*H04L 12/911* (2013.01)
*G06F 9/455* (2018.01)
(Continued)

(52) U.S. Cl.
CPC ........ *H04L 47/781* (2013.01); *G06F 9/45558* (2013.01); *H04L 47/38* (2013.01); *H04L 47/765* (2013.01)

(58) Field of Classification Search
CPC ... H04L 47/10; H04L 47/781; H04L 12/4633; H04L 12/6418; G06F 9/45558
(Continued)

(56) References Cited

U.S. PATENT DOCUMENTS 7,782,869 B1 * 8/2010 Chitlur Srinivasa ....................... G06F 9/5011 370/230
8,086,765 B2 * 12/2011 Turner ................ G06F 12/1081 710/1
9,507,617 B1 * 11/2016 Wang .................... G06F 9/4555
(Continued)

FOREIGN PATENT DOCUMENTS

TW I303025 B 11/2008
TW 201019263 A 5/2010

*Primary Examiner* — Ranodhi Serrao
*Assistant Examiner* — James N Fiorillo
(74) *Attorney, Agent, or Firm* — Schmeiser, Olsen & Watts, LLP (57) ABSTRACT

An expansion device for a virtual interface is provided. The expansion device is disposed on a mainboard of a server and is configured to acquire control of a plurality of physical resources of the server. The expansion device includes a virtual interface demand control module and a resource management module. The resource management module includes a transmission unit and a physical resource protocol unit. The virtual interface demand control module is configured to acquire control of a plurality of client facilities and arrange a demand timing of each of the client facilities to generate a plurality of interface operation signals. The transmission unit is configured to manage datastreams of the interface operation signals transmitted from the mainboard to the physical resources to decrease central processing unit (CPU) usage on the server. The physical resource protocol unit is configured to control the physical resources according to the interface operation signals.

8 Claims, 4 Drawing Sheets

1

(51) Int. Cl.
*H04L 12/919* (2013.01)
*H04L 12/811* (2013.01)

(58) Field of Classification Search
USPC .................................. 709/212, 226; 718/1
See application file for complete search history.

(56) References Cited

U.S. PATENT DOCUMENTS

| | | | | |
|---|---|---|---|---|
| 2007/0025252 A1* | 2/2007 | McGee | ................... | H04L 47/10 370/235 |
| 2007/0025253 A1* | 2/2007 | Enstone | ................. | H04L 47/10 370/235 |
| 2010/0226548 A1 | 9/2010 | Abdo et al. | | |
| 2011/0069710 A1* | 3/2011 | Naven | .................. | G06F 13/404 370/395.3 |
| 2011/0296101 A1* | 12/2011 | Kawamura | ........... | G06F 3/0608 711/113 |
| 2011/0320666 A1* | 12/2011 | Gregg | ................. | G06F 13/4027 710/300 |
| 2012/0131377 A1* | 5/2012 | Baird | ................. | G06F 11/1479 714/4.11 |
| 2012/0246637 A1* | 9/2012 | Kreeger | .............. | H04L 67/1038 718/1 |
| 2012/0250686 A1* | 10/2012 | Vincent | .............. | H04L 12/4633 370/392 |
| 2013/0013664 A1* | 1/2013 | Baird | .................... | H04L 67/025 709/203 |
| 2013/0093776 A1* | 4/2013 | Chakraborty | ........... | G06F 9/452 345/520 |
| 2013/0160014 A1* | 6/2013 | Watanabe | ................. | G06F 9/50 718/1 |
| 2013/0318522 A1* | 11/2013 | Devireddy | .......... | H04L 12/6418 718/1 |
| 2014/0012892 A1* | 1/2014 | Jaudon | .................. | H04L 67/141 709/203 |
| 2014/0189682 A1* | 7/2014 | Crudele | ................ | G06F 9/45558 718/1 |
| 2014/0351812 A1* | 11/2014 | Imai | .................... | G06F 9/45533 718/1 |
| 2015/0032897 A1* | 1/2015 | Deshpande | ......... | H04L 43/0817 709/226 |
| 2015/0312093 A1* | 10/2015 | Woloschek | ............. | H04L 49/25 370/254 |
| 2016/0139947 A1* | 5/2016 | Mathews | ............ | G06F 9/45558 718/1 |
| 2016/0173600 A1* | 6/2016 | Galles | ................ | G06F 9/45558 709/212 |
| 2016/0216993 A1* | 7/2016 | Beckwith | ............ | G06F 9/45558 |
| 2016/0246341 A1* | 8/2016 | Burrell | ....................... | G06F 1/26 |
| 2017/0034046 A1* | 2/2017 | Cai | ......................... | H04L 45/24 |
| 2017/0286252 A1* | 10/2017 | Illikkal | ................... | H04L 47/76 |

* cited by examiner

EXPANSION DEVICE FOR VIRTUAL INTERFACE AND NETWORK SERVER SYSTEM THEREOF

BACKGROUND

1. Technical Field

The present invention generally relates to a hardware device of a server and, more particularly, to a hardware device for expanding functions of a server.

2. Description of Related Art

In recent years, with the popularity of cloud computing services, virtual desktop technology has become widely used. The virtual desktop technology rapidly allocates resources and accesses services to decrease the burden on the user's end and further reduce the cost for the enterprise.

Virtual desktop infrastructure (VDI) is a process of a virtual desktop technology. VDI enables the user to access the image file of the operating system executed on a server so that each user can access the personal desktop through an authorized device. The benefit of using VDI is that the enterprise can select the most suitable way of allocating hardware devices according to the demands of different departments and employees. For example, the financial department or the sales department only has to use thin-client computers, instead of using high-end computers. Accordingly, the operation cost of the enterprise may be effectively reduced.

In general, VDI may be divided into two models: the terminal service model and the system virtualization model. In the terminal service model, the server uses specific software or operating systems so that multiple users may use the resources or applications on the server through remote control. In the system virtualization model, the server is installed with multiple virtual machines thereon. Each of the virtual machines may be allotted to a user so that the user may access hardware devices on the server through the virtual machine.

However, conventional VDI has a problem that the hardware resources on the server are categorized by software and different protocols, and remote software is used to fulfill its functions. In other words, the central processing unit (CPU) usage increases when the server is accessed by more users. Accordingly, the overall server performance is lowered.

SUMMARY

One aspect of the present invention provides an expansion device for a virtual interface. The expansion device for a virtual interface is disposed on a mainboard of a server and is configured to acquire control of N physical resources of the server to share central processing unit (CPU) usage on the server. N is a positive integer larger than or equal to 1. The expansion device includes a virtual interface demand control module and a resource management module. The virtual interface demand control module is coupled to M client facilities. M is a positive integer larger than or equal to N. The resource management module is coupled between the virtual interface demand control module and the N physical resources. The resource management module includes a transmission unit and a physical resource protocol unit. The virtual interface demand control module is configured to acquire control of the M client facilities and arrange a demand timing of each of the M client facilities to generate at least M interface operation signals. The transmission unit is configured to manage datastreams of the at least M interface operation signals transmitted from the mainboard to the N physical resources to decrease the CPU usage. The physical resource protocol unit is configured to control the N physical resources and feedback services provided by the N physical resources to the M client facilities according to the at least M interface operation signals.

Another aspect of the present invention provides a network server system. The network server system includes M client facilities and at least one server. The server includes an expansion device for a virtual interface. The expansion device is disposed on a mainboard of a server and is configured to acquire control of N physical resources of the server to share central processing unit (CPU) usage on the server. N is a positive integer larger than or equal to 1. M is a positive integer larger than or equal to N. The expansion device includes a virtual interface demand control module and a resource management module. The virtual interface demand control module is coupled to M client facilities. The resource management module is coupled between the virtual interface demand control module and the N physical resources. The virtual interface demand control module is configured to acquire control of the M client facilities and arrange a demand timing of each of the M client facilities to generate at least M interface operation signals. The virtual interface demand control module controls traffic between the M client facilities and a plurality of the virtual machines to manage resources used by the M client facilities, and the virtual interface demand control module isolates respective packets of the N physical resources.

As previously stated, the present invention provides an expansion device and a network server system for a virtual machine that are capable of sharing the usage of a CPU and a network card on a server so as to solve the problem that the usage of the CPU and the network card increases with the number of client facilities. Moreover, the expansion device can manage the resources used by the client facilities to make the most of the resources.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," etc., may be used to describe various components, such components must not be limited to the above terms. The above terms are used only to distinguish one component from another. For example, a second component may be referred to as a first component within the scope of the present disclosure, and similarly, the first component may be referred to as the second component. As used herein, the term "and/or" includes any and all combinations of one or more of the associated listed items.

The physical resource protocol unit 1311 includes the PCI-E bus, the single-root I/O virtualization (SRIOV) bus or the multi-root I/O virtualization (MRIOV) bus. The resource management module 131 includes logic and/or coding circuitry configured to control the plurality of virtual machines 101_1, 101_2, . . . 101_N according to the plurality of interface operation signals and feedback the services (such as video signals) provided by the plurality of virtual machines 101_1, 101_2, . . . 101_N to the plurality of client facilities 11_1, 11_2, . . . 11_M.

The operation of the network server system 1 will be presented herein. When the user wants to control a virtual machine through a client facility (for example, the first client facility 11_1), the first client facility 11_1 sends a registration signal to the expansion device 13 on the server 10. The virtual interface demand control module 130 of the expansion device 13 selects a suitable virtual machine (for example, the first virtual machine 101_1) from the plurality of virtual machines 101_1, 101_2, . . . 101_N according to the protocol used by the first client facility 11_1. The virtual interface demand control module 130 records an identification number of the first client facility 11_1 and a virtual hardware address corresponding to the first virtual machine 101_1. Accordingly, the linking between the first client facility 11_1 and the first virtual machine 101_1 is built up.

Then, the user can operate the first client facility 11_1 to generate a control signal to control the first virtual machine 101_1. When the transceiver of the virtual interface demand control module 130 receives the control signal outputted by the first client facility 11_1, the processing unit executes a format transformation on the control signal according to the virtual operating system used by the first virtual machine 101_1 to convert the control signal into a suitable hardware signal, for example, a USB-formatted interface operation signal.

The transmission unit 1310 of the expansion device 13 outputs the USB-formatted interface operation signal to the physical resource protocol unit 1311. Then, the physical resource protocol unit 1311 converts the USB-formatted interface operation signal into a PCI-E formatted interface operation signal and outputs the PCI-E formatted interface operation signal to the central processing unit of the server 10. The central processing unit controls the first virtual machine 101_1 according to the PCI-E formatted interface operation signal to execute corresponding functions and provides an execution result.

The first virtual machine 101_1 outputs the execution result to the virtual interface demand control module 130 through the resource management module 131. The virtual interface demand control module 130 performs a format transformation on the execution result according to the protocol used by the first client facility 11_1 and then the transceiver transmits the execution result that has undergone the format transformation to the first client facility 11_1. Accordingly, first client facility 11_1 provides the user with the execution result.

The operations of the second virtual machine 101_2 to the $N^{th}$ virtual machine 101_N corresponding to the second client facility 11_2 to the $M^{th}$ client facility 11_M are similar to the operation of the first virtual machine 101_1, and thus descriptions thereof are not presented herein.

Moreover, the operation signal can be converted into a suitable hardware signal by the virtual interface demand control module 130 or the resource management module 131 as long as the expansion device 13 can convert the operation signal into the suitable hardware signal according to the virtual operating system used by the plurality of virtual machines 101_1, 101_2, . . . 101_N.

In other embodiments, the virtual interface demand control module 130 can convert the operation signal into a PCI-E formatted interface operation signal and output the PCI-E formatted interface operation signal to the corresponding virtual machine through the resource management module 131.

To make the present invention more understood, the present embodiment is exemplified by an example herein. When the user moves the mouse of the first client facility 11_1, the first client facility 11_1 outputs an operation signal to the expansion device 13. In the present embodiment, the first client facility 11_1 builds up the linking to the server 10 through the remote desktop protocol.

As previously stated, after the virtual interface demand control module 130 of the expansion device 13 performs a format transformation on the interface operation signal, the interface operation signal that has undergone the format transformation is outputted to the first virtual machine 101_1. The first virtual machine 101_1 correspondingly moves the cursor corresponding to the mouse according to the interface operation signal and provides the execution result (for example, a video signal with a moving cursor of the mouse). After the virtual interface demand control module 130 receives the video signal, the video signal is converted into a format corresponding to the remote desktop protocol and is transmitted back to the first client facility 11_1. Accordingly, the user can view the video signal with the moving cursor of the mouse.

As previously stated, the plurality of client facilities 11_1, 11_2 . . . 11_M communicate through the expansion device 13 and the plurality of virtual machines 101_1, 101_2 . . . 101_N. The processing unit of the expansion device 13 schedules the plurality of client facilities 11_1, 11_2, . . . 11_M and controls the communication between the plurality of client facilities 11_1, 11_2, . . . 11_M and the plurality of virtual machines 101_1, 101_2, . . . 101_N to transmit the received packets to corresponding destinations. Moreover, the expansion device 13 further isolates the packets transmitted or received respectively by the plurality of virtual machines 101_1, 101_2 . . . 101_N.

For the server 10, the expansion device 13 replaces software computing on the server 10. The central processing unit of the server 10 may reduce allotting the virtual machines or signal format transformation. The central processing unit only has to control the virtual machine to provide video data and input the video data to the expansion device 13. For the plurality of client facilities 11_1, 11_2 . . . 11_M, the client facilities are linked to the expansion device 13 through the network, instead of being linked to the operating system or applications of the server 10.

It should be noted that the expansion device 13 only uses a PCI-E bus on the mainboard of the server 10. Compared to the conventional server, the server 10 of the present invention may connect more devices through other PCI-E buses.

Moreover, the expansion device 13 also controls the traffic between the plurality of client facilities 11_1, 11_2 . . . 11_M and the plurality of virtual machines 101_1, 101_2 . . . 101_N. As previously stated, the plurality of client facilities 11_1, 11_2 . . . 11_M and the plurality of virtual machines 101_1, 101_2 . . . 101_N communicate through the expansion device 13. In other words, the virtual interface demand control module 130 of the expansion device 13 manages or monitors resources used by the client facilities. When there is a problem with the linking to one of the client facilities, the manager only has to check the record of the expansion device 13 to know which client facility has a problem and when the problem took place.

Accordingly, there can be an analogy between the server and a company having a factory and an analogy between the user and a customer. The customer places an order so that a product management department of the company (analogous to the resource management module 131) determines which product to be made by which production line according to the customer's demand.

However, in the conventional architecture, the server is not provided with salespersons and can only accept the number of orders determined by the number of client facilities. The central processing unit determines production schedules and the firmware (analogous to the resource management module 131) executes the manufacture.

In the present invention, the architecture is provided with salespersons corresponding to the customers. In other words, each salesperson (analogous to the virtual interface demand control module 130) provides at least one customer with services if the virtual interface demand control module 130 acquires control of the user hardware facility so that the number of interfaces operated by a user can be expanded to two or more. Accordingly, each salesperson (analogous to the virtual interface demand control module 130) can optionally schedule the order of at least one customer to increase the activation of the production lines (analogous to the physical resources).

From the viewpoint of a system engineer, the expansion device of the present invention can be analogous to an independent graphic card of a general computer. The independent graphic card includes a graphic processing unit (GPU) and processes control of the datastream on a mainboard so as to intercept or monopolize graphic information with long threads, which is not suitable to be processed by the central processing unit (CPU), from the applications and feedback the processed result to the applications.

On the contrary, in the present embodiment, multiple remote client demands are monopolized and transmission units (for example, the video USB) are used to provide the resource management module 131 with additional datastreams on the mainboard of the server datastream. In the present embodiment, there is a significant difference between the expansion device and the graphic card in view of the operations. To provide more client facilities having discrete demands with services, the expansion device 13 of the present embodiment acquires control of the client facilities to some extent so as to provide virtual, expanded operation interfaces on the client end. From the viewpoint of the user, an operation interface can therefore be expanded to at least two operation interfaces. From the viewpoint of the server system end, however, the server 10 provides multiple virtual machines therein capable of making extreme use of the physical resources.

On the other hand, the network server system 1 further includes a manager facility 12. The manager facility 12 is coupled to the virtual interface demand control module 130 of the expansion device 13. The virtual interface demand control module 130 includes logic and/or coding circuitry configured to determine whether the plurality of client facilities 11_1, 11_2 . . . 11_N may be linked to the plurality of virtual machines 101_1, 101_2 . . . 101_N. For example, when the second client facility 11_2 sends a registration signal to the expansion device 13, the manager facility 12 determines whether the second client facility 11_2 is an illegal client facility. If the second client facility 11_2 is determined to be an illegal client facility, the manager facility 12 commands the virtual interface demand control module 130 to refuse the register request of the second client facility 11_2. Otherwise, the manager facility 12 allows the second client facility 11_2 and the virtual interface demand control module 130 to be linked to each other.

Moreover, the manager facility 12 may also allot the resources used by the plurality of client facilities 11_1, 11_2 . . . 11_N. For example, if the priority of the first client facility 11_1 is higher than the priority of the second client facility 11_2, the manager facility 12 may control the virtual interface demand control module 130 to increase the bandwidth available for the first client facility 11_1 to meet the practical demands of the first client facility 11_1.

Figure 3:
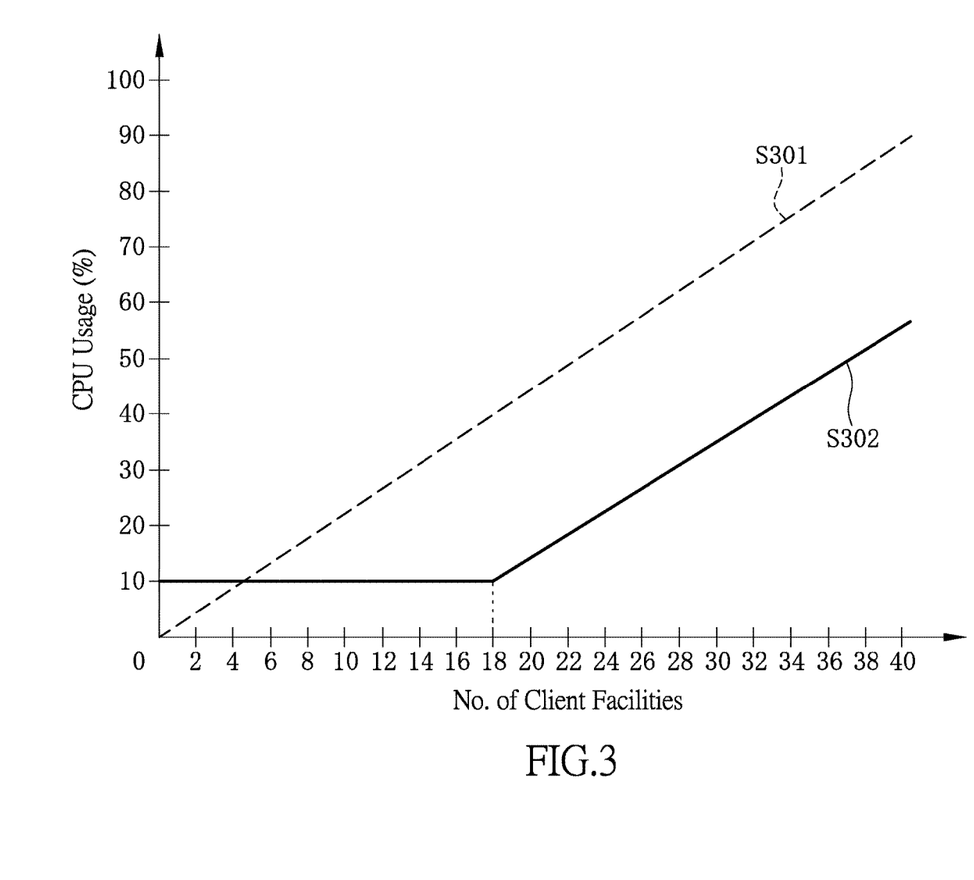
FIG. 3 is a graph showing the relation between CPU usage and the number of client facilities according to one embodiment of the present invention.

Referring to FIG. 3, FIG. 3 is a graph showing the relation between CPU usage and the number of client facilities according to one embodiment of the present invention. In FIG. 3, the longitudinal axis represents the CPU usage (%), while the horizontal axis represents the number of client facilities connected to the server 10. In FIG. 3, two lines are provided. Line S301 corresponds to the conventional network server system, and line S302 corresponds to the network server system 1 according to the present invention. It should be noted that the difference between the conventional network server system and the network server system 1 according to one embodiment of the present invention is that the server 10 of the network server system 1 according to one embodiment of the present invention further includes an expansion device 13.

Line S301 is a linear line. In other words, the CPU usage of the server increases with the increase of the number of client facilities. On the other hand, from line S302, when the number of client facilities is lower than a specific value (for example, 18 in the present embodiment), the CPU usage of the server 10 is kept low (for example, 10%). When the number of client facilities is higher than a specific value, the CPU usage of the server 10 starts to increase. Accordingly, the network server system 1 of the present invention uses the expansion device 13 to share the CPU usage of the server 10 and effectively reduce the CPU usage of the server 10. Compared to the conventional network server system, the network server system 1 of the present invention can solve the problem of high CPU usage due to the high number of client facilities.

Figure 1:
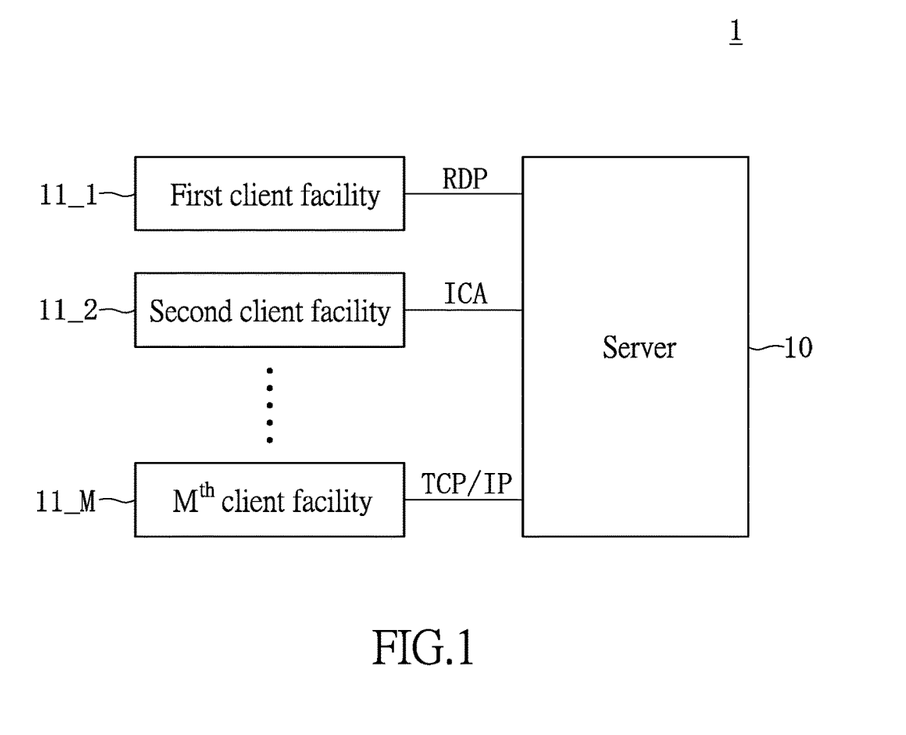
FIG. 1 is a schematic diagram of a network server system according to one embodiment of the present invention.
Figure 2:
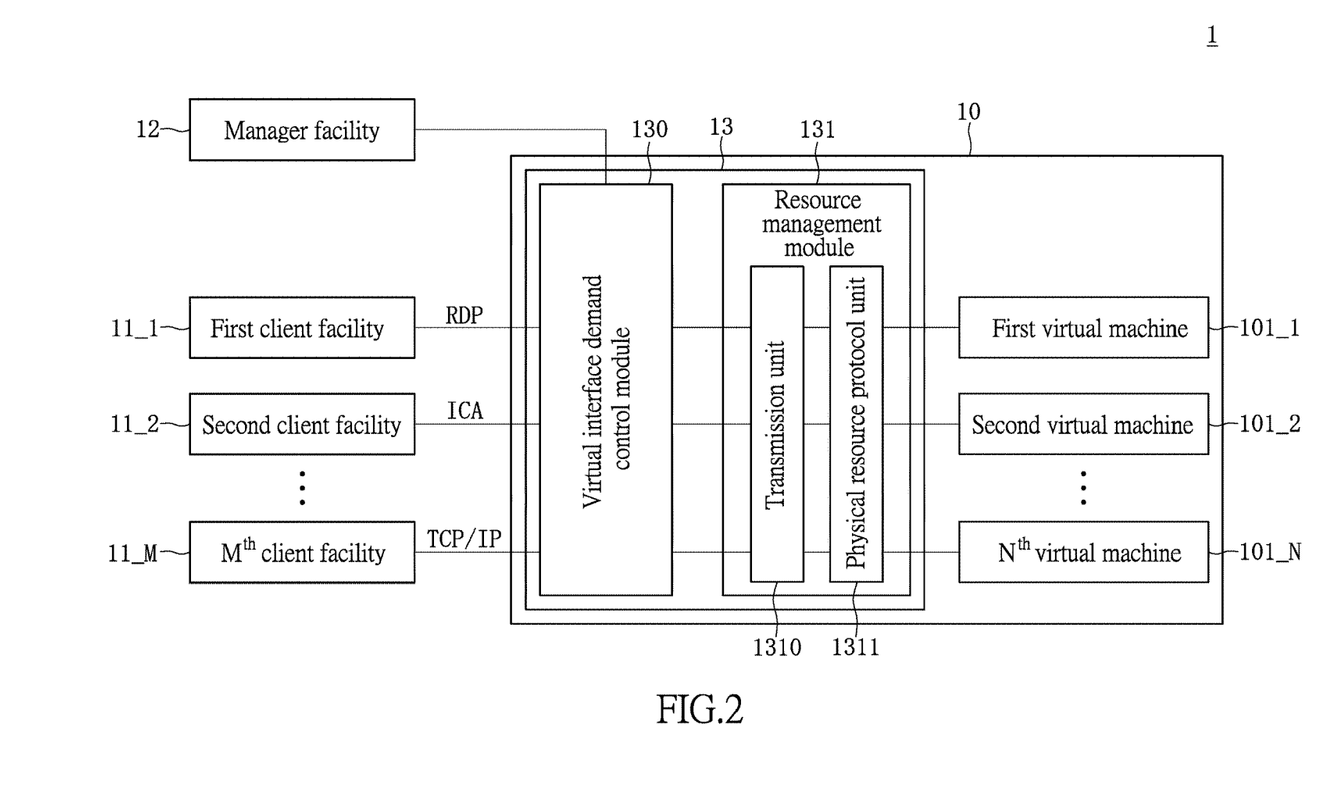
FIG. 2 is a block diagram of a server according to one embodiment of the present invention.
Figure 4:
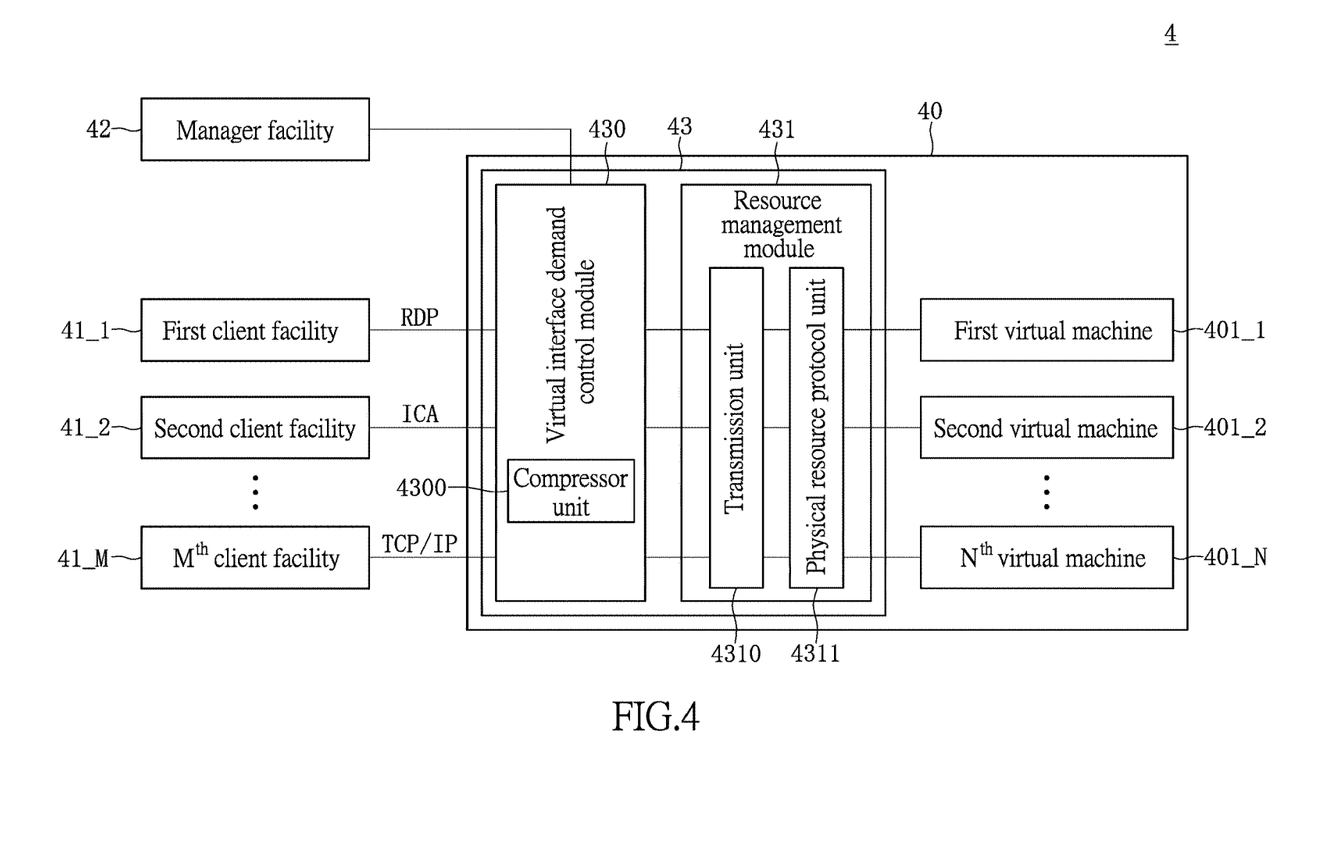
FIG. 4 is a block diagram of a server according to another embodiment of the present invention.

Referring to FIG. 4, FIG. 4 is a block diagram of the server according to another embodiment of the present invention. Similarly, the network server system 4 in FIG. 4 includes a plurality of client facilities 41_1, 41_2 . . . 41_M and a server 40. The server 40 includes a virtual interface demand control module 430, a resource management module 431 and a plurality of physical resources (i.e., virtual machines 401_1, 401_2 . . . 401_N). The architecture and operation of the network server system 4 are similar to those of the network server system 1 in FIG. 2, only the differences between the network server system 4 and the network server system 1 are described herein.

The virtual interface demand control module 430 is different from the network server system 1 in that the virtual interface demand control module 430 further includes a compressor unit 4300. The compressor unit 4300 includes logic and/or coding circuitry configured to compress the execution result (for example, the video data) outputted by the plurality of virtual machines 401_1, 401_2 . . . 401_N. Accordingly, the bandwidth loss when the expansion device 43 transmits the execution result to the plurality of client facilities 41_1, 41_2 . . . 41_N may be significantly reduced.

As previously stated, the present invention provides an expansion device and a network server system for a virtual machine that are capable of sharing the usage of a CPU and a network card on a server so as to solve the problem that the usage of the CPU and the network card increases with the number of client facilities. Moreover, the expansion device can manage the resources used by the client facilities to make the most of the resources.

From the viewpoint of a firmware engineer, it is easy to make modifications by changing the number of virtual machines because the functions of the system are implemented using video signals and USB interfaces. Expanding the virtual interfaces is equivalent to increasing the number of virtual machines in any virtual machine or virtual operating system.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A network server system, comprising:
M client facilities; and
at least one server comprising an expansion device for a virtual interface disposed on a mainboard of said server and configured to acquire control of N physical resources of said server to share central processing unit (CPU) usage on said server, wherein N is a positive integer larger than or equal to 1 and M is a positive integer larger than or equal to N, said expansion device comprising:
a virtual interface demand control module being coupled to said M client facilities and configured to acquire control of said M client facilities and arrange a demand timing of each of said M client facilities to generate at least M interface operation signals; and
a resource management module being coupled between said virtual interface demand control module and said N physical resources;
wherein said virtual interface demand control module controls traffic between said M client facilities and a plurality of virtual machines to manage resources used by said M client facilities, and said virtual interface demand control module isolates respective packets of said N physical resources;
wherein when said expansion device receives a registration signal from a first client facility of said M client facilities, said virtual interface demand control module selects a first virtual machine from said plurality of virtual machines according to a protocol used by said first client facility so as to build up a linking between said first client facility and said first virtual machine;
when said virtual interface demand control module receives a control signal outputted by said first client facility after said linking is built up, said virtual interface demand control module executes a format transformation on said control signal according to a virtual operating system used by said first virtual machine to convert said control signal into a hardware signal;
said resource management module converts said hardware signal into a corresponding interface operation signal for an expansion bus on said mainboard of said server and outputs said corresponding interface operation signal to a central processing unit of said server so that said central processing unit of said server controls said first virtual machine according to said corresponding interface operation signal to execute corresponding functions and provides an execution result.

2. The network server system of claim 1, wherein said resource management module comprises:
a transmission unit being configured to manage datastreams of said at least M interface operation signals transmitted from said mainboard to said N physical resources to decrease said CPU usage; and
a physical resource protocol unit being configured to control said N physical resources and feedback services provided by said N physical resources to said M client facilities according to said at least M interface operation signals.

3. The network server system of claim 1, wherein said virtual interface demand control module performs a format transformation on said at least M interface operation signals according to a virtual operating system used by said N physical resources so that said N physical resources provide corresponding execution results according to said at least M interface operation signals having undergone said format transformation, and then said virtual interface demand control module performs said format transformation on said execution results according to a protocol used by said M client facilities and feedbacks said execution results having undergone said format transformation to said M client facilities corresponding thereto.

4. The network server system of claim 1, wherein said M client facilities comprise at least one of a thin-client facility, a zero-client facility, a personal computer and a notebook computer.

5. The network server system of claim 1, wherein said virtual interface demand control module comprises a compressor unit being configured to compress execution results provided by said N physical resources to reduce bandwidth loss during transmission.

6. The network server system of claim 1, wherein a manager facility is coupled to said virtual interface demand control module and configured to determine whether to allow said M client facilities to register, wherein said virtual interface demand control module builds up interconnections between said M client facilities and said N physical resources when said manager facility allows said M client facilities to register, or said virtual interface demand control module refuses said plurality of virtual machines to register when said manager facility disallows said M client facilities to register.

7. An expansion device for a virtual interface being disposed on a mainboard of a server and configured to acquire control of N physical resources of said server to share central processing unit (CPU) usage on said server, N being a positive integer larger than or equal to 1, said expansion device comprising:

a virtual interface demand control module being coupled to M client facilities and configured to acquire control of said M client facilities and arrange a demand timing of each of said M client facilities to generate at least M interface operation signals, wherein M is a positive integer larger than or equal to N; and a resource management module being coupled between said virtual interface demand control module and said N physical resources, said resource management module comprising:

a transmission unit being configured to manage datastreams of said at least M interface operation signals transmitted from said mainboard to said N physical resources to decrease said CPU usage; and a physical resource protocol unit being configured to control said N physical resources and feedback services provided by said N physical resources to said M client facilities according to said at least M interface operation signals;

wherein when said expansion device receives a registration signal from a first client facility of said M client facilities, said virtual interface demand control module selects a first virtual machine from a plurality of virtual machines according to a protocol used by said first client facility so as to build up a linking between said first client facility and said first virtual machine;

when said virtual interface demand control module receives a control signal outputted by said first client facility after said linking is built up, said virtual interface demand control module executes a format transformation on said control signal according to a virtual operating system used by said first virtual machine to convert said control signal into a hardware signal;

said transmission unit outputs said hardware signal to said physical resource protocol unit;

said physical resource protocol unit converts said hardware signal into a corresponding interface operation signal for an expansion bus on said mainboard of said server and outputs said corresponding interface operation signal to a central processing unit of said server so that said central processing unit of said server controls said first virtual machine according to said corresponding interface operation signal to execute corresponding functions and provides an execution result.

8. The expansion device of claim 7, wherein said virtual interface demand control module comprises a compressor unit being configured to compress execution results provided by said N physical resources to reduce bandwidth loss during transmission.

* * * * *